United States Patent
Qi et al.

(10) Patent No.: US 10,685,261 B2
(45) Date of Patent: Jun. 16, 2020

(54) ACTIVE SEGMENTION OF SCANNED IMAGES BASED ON DEEP REINFORCEMENT LEARNING FOR OCR APPLICATIONS

(71) Applicant: GM Global Technology Operations LLC, Detroit, MI (US)

(72) Inventors: Xuewei Qi, Sterling Heights, MI (US); Orhan Bulan, Troy, MI (US); David H. Clifford, Royal Oak, MI (US); David J. Hiemenga, Grand Rapids, MI (US); Yehenew G. Mengistu, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 194 days.

(21) Appl. No.: 16/004,735

(22) Filed: Jun. 11, 2018

(65) Prior Publication Data

US 2019/0377988 A1 Dec. 12, 2019

(51) Int. Cl.
*G06K 9/62* (2006.01)
*G06T 7/11* (2017.01)
*H04N 1/028* (2006.01)
*G06K 9/00* (2006.01)

(52) U.S. Cl.
CPC ....... *G06K 9/6268* (2013.01); *G06K 9/00463* (2013.01); *G06T 7/11* (2017.01); *H04N 1/02805* (2013.01); *G06K 2209/01* (2013.01); *G06T 2207/20081* (2013.01)

(58) Field of Classification Search
CPC ............. G06K 9/6268; G06K 9/00463; G06K 2209/01; G06K 9/344; G06K 9/70; H04N 1/02805; G06T 7/11; G06T 2207/20081
See application file for complete search history.

(56) References Cited

U.S. PATENT DOCUMENTS

| | | | | |
|---|---|---|---|---|
| 4,903,311 A | * | 2/1990 | Nakamura | G06K 9/34 382/174 |
| 5,267,326 A | * | 11/1993 | Rao | G06K 9/342 382/179 |
| 5,487,117 A | * | 1/1996 | Burges | G06K 9/344 382/173 |
| 5,504,822 A | * | 4/1996 | Holt | G06K 9/00 382/135 |
| 5,513,277 A | * | 4/1996 | Huttenlocher | G06K 9/34 382/171 |
| 5,757,963 A | * | 5/1998 | Ozaki | G06K 9/00463 382/175 |

(Continued)

*Primary Examiner* — Xuemei G Chen

(57) ABSTRACT

A system for partitioning a two-dimensional (2D) array and recognizing elements of the 2D array selects a location in an array comprising pixel data of the 2D array; and selects a direction in which to traverse the array from the selected location to segment the elements of the 2D array. The system uses a model and a reward/penalty function to guide the traversal through the array. The system changes direction when the data encountered while traversing the array in the selected direction represents one of the elements of the 2D array and continues in the selected direction when the data represents a joint between two elements of the 2D array. The system recognizes one or more of the elements of the 2D array segmented by traversing the array.

20 Claims, 14 Drawing Sheets

(56) References Cited

U.S. PATENT DOCUMENTS

| | | | | |
|---|---|---|---|---|
| 6,249,604 B1* | 6/2001 | Huttenlocher | G06K 9/00463 | 382/174 |
| 6,748,115 B1* | 6/2004 | Gross | G06T 9/00 | 382/218 |
| 7,095,891 B1* | 8/2006 | Takebe | G06K 9/344 | 382/177 |
| 7,142,716 B2* | 11/2006 | Katsuyama | G06K 9/03 | 382/190 |
| 7,471,826 B1* | 12/2008 | Navon | G06K 9/344 | 358/453 |
| 8,102,397 B2* | 1/2012 | Perry | G06T 11/203 | 345/467 |
| 8,351,700 B2* | 1/2013 | D'Agostino | G06K 9/344 | 382/173 |
| 8,600,171 B2* | 12/2013 | Mathew | G06K 9/342 | 358/1.9 |
| 8,832,549 B2* | 9/2014 | Mansfield | G06F 40/103 | 715/243 |
| 8,953,885 B1* | 2/2015 | Och | G06K 9/50 | 382/177 |
| 9,280,725 B2* | 3/2016 | Kimura | G06K 9/72 | |
| 9,740,925 B2* | 8/2017 | Haji | G06K 9/00879 | |
| 10,140,262 B2* | 11/2018 | Elarian | G06F 40/129 | |
| 2003/0123730 A1* | 7/2003 | Kim | G06K 9/00463 | 382/177 |
| 2011/0007366 A1* | 1/2011 | Sarkar | G06K 9/00456 | 358/462 |
| 2012/0033887 A1* | 2/2012 | Tanaka | G06K 9/342 | 382/176 |
| 2012/0050295 A1* | 3/2012 | Tanaka | G06K 9/342 | 345/467 |
| 2013/0163871 A1* | 6/2013 | Salvo | G06K 9/325 | 382/176 |
| 2015/0125041 A1* | 5/2015 | Burry | G06K 9/34 | 382/105 |
| 2016/0267323 A1* | 9/2016 | Chulinin | G06K 9/00463 | |
| 2018/0005058 A1* | 1/2018 | Yang | G06K 9/00859 | |
| 2018/0089525 A1* | 3/2018 | Yang | G06K 9/346 | |
| 2020/0005094 A1* | 1/2020 | Sinha | G06N 3/0454 | |

\* cited by examiner

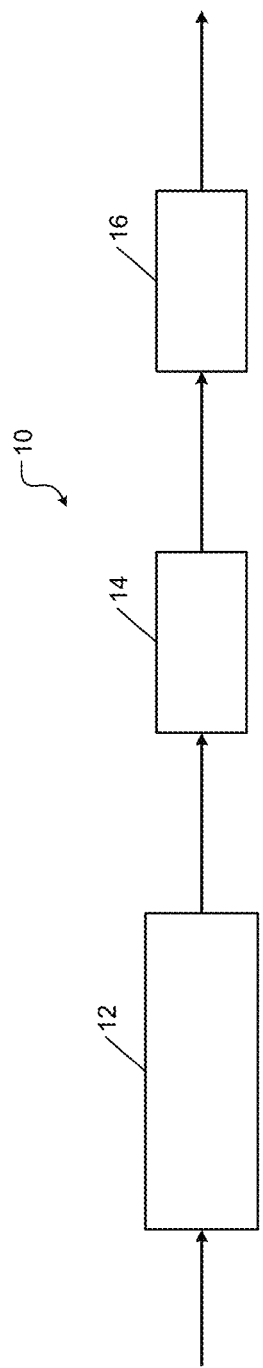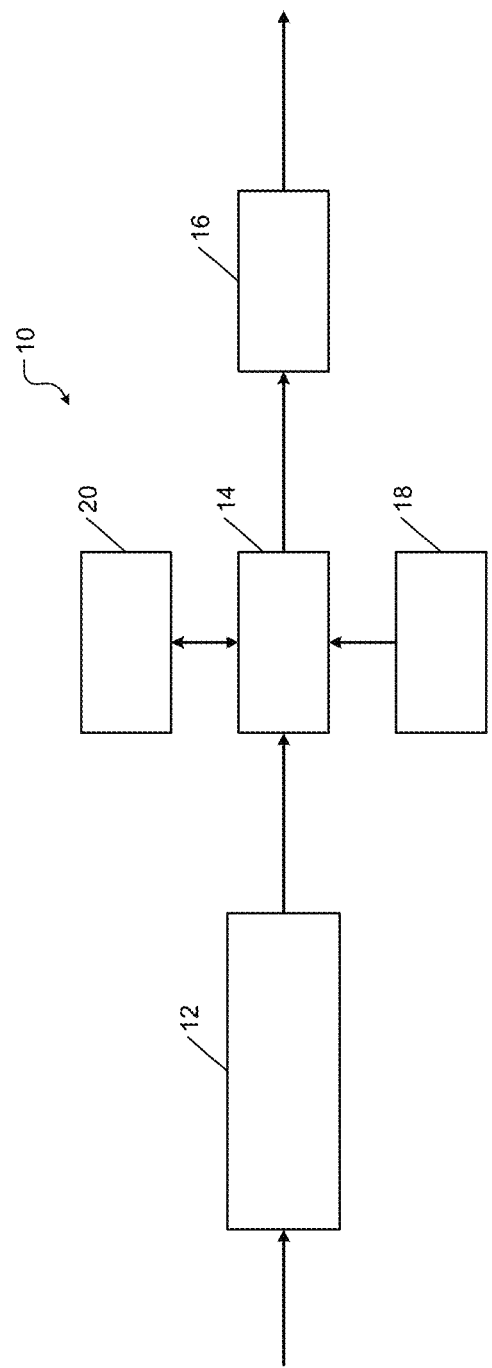

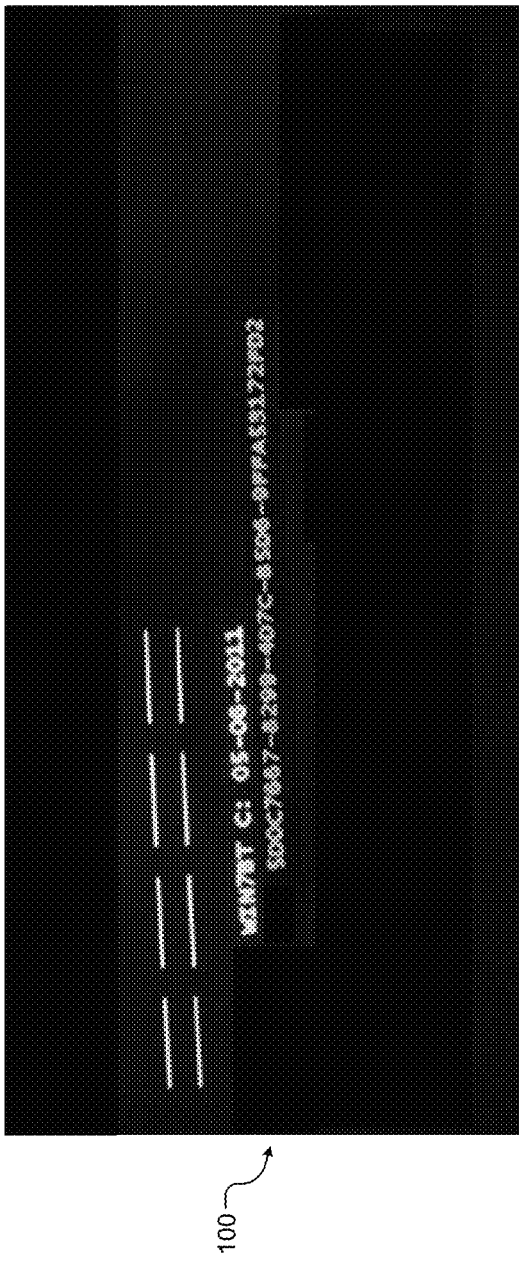
FIG. 2A
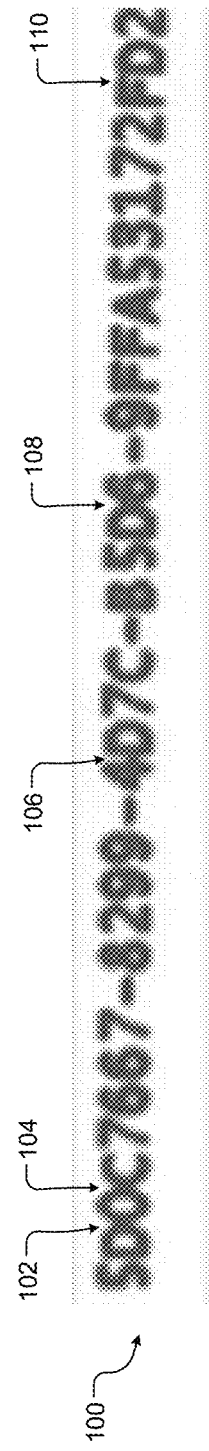
FIG. 2B
5DOC7667-8299-4D7C-B5D6-9FFA53172FD2
FIG. 2C

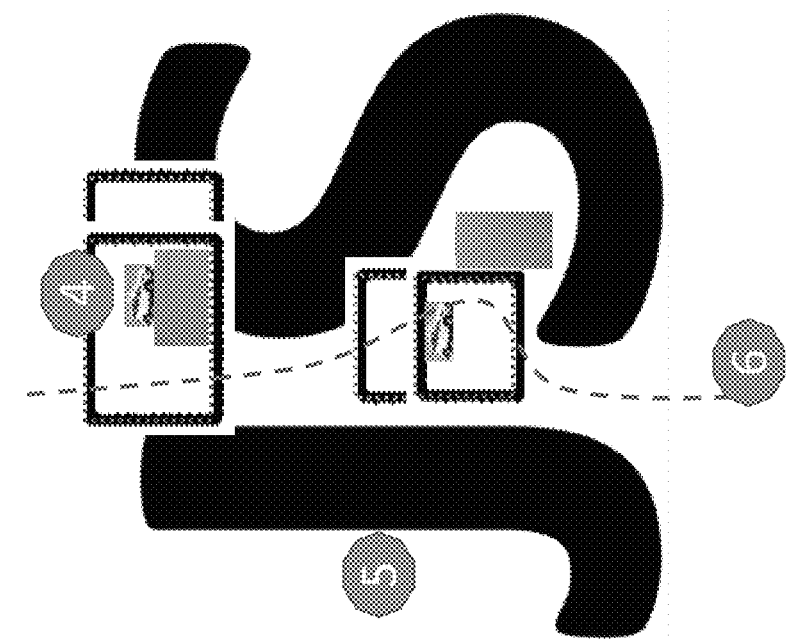
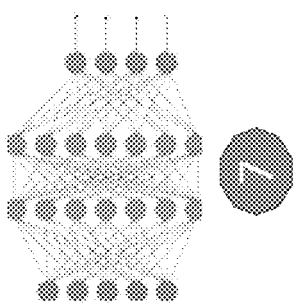
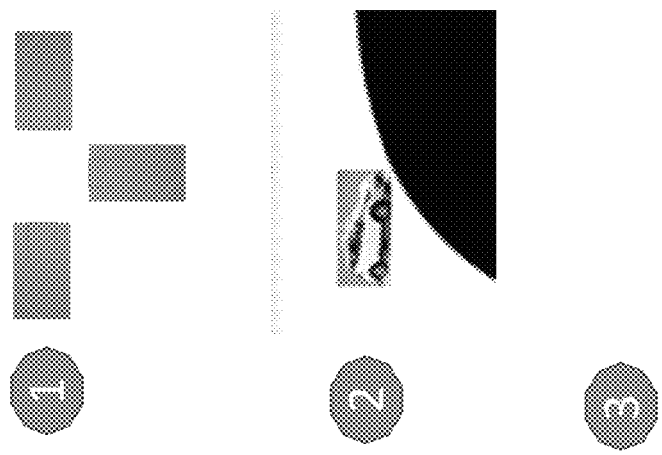
FIG. 4

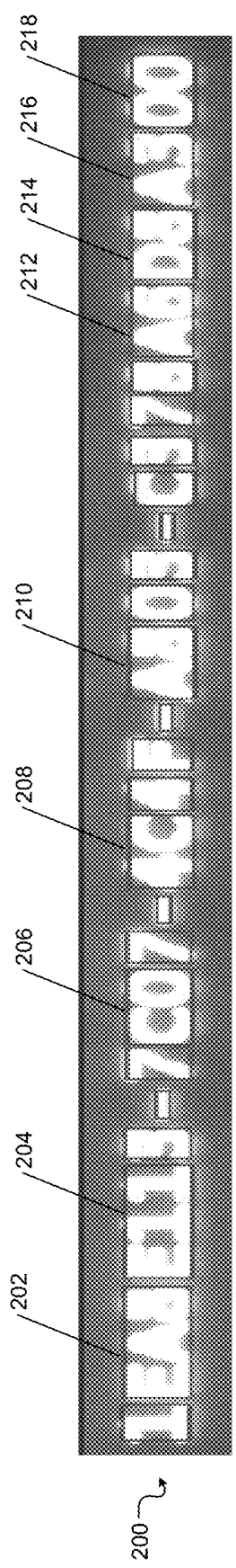
FIG. 6A
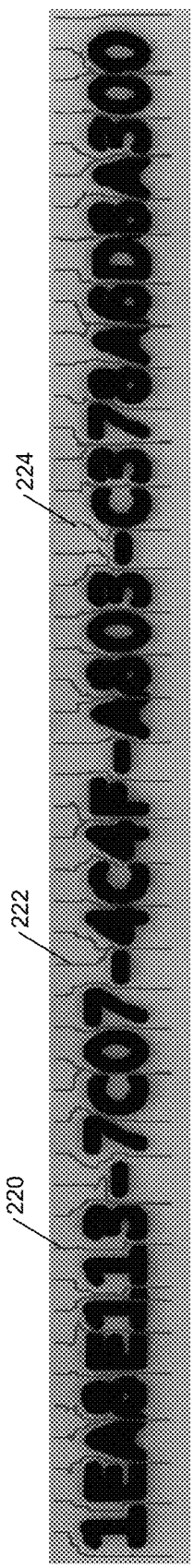
FIG. 6B
1EA8E113-7C07-4C4F-A803-C378A6D8A300
FIG. 6C

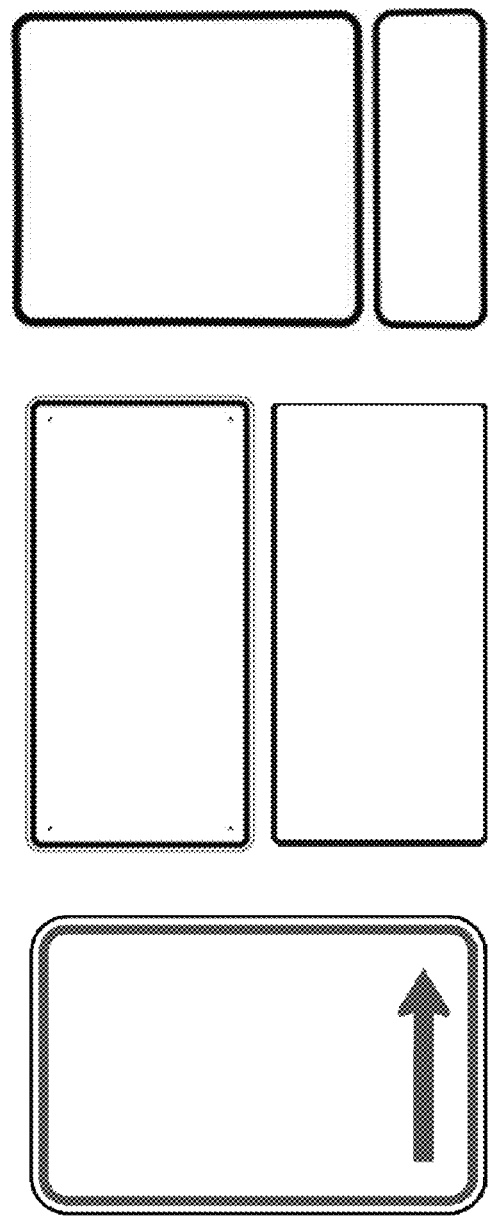

ACTIVE SEGMENTION OF SCANNED IMAGES BASED ON DEEP REINFORCEMENT LEARNING FOR OCR APPLICATIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to optical character recognition (OCR) systems and more particularly to active segmentation of scanned images based on deep reinforcement learning for OCR applications.

SUMMARY

A system for partitioning a two-dimensional (2D) array and recognizing elements of the 2D array comprises a processor and memory storing instructions for the processor. The processor is configured to execute the instructions to select a location in an array comprising pixel data of the 2D array; select a direction in which to traverse the array from the selected location to segment the elements of the 2D array, the selected direction being based on data surrounding the selected location and based on a model generated by segmenting a plurality of 2D arrays; and define a penalty function and a reward function based on needs of an application partitioning the 2D array. The processor is configured to execute the instructions to increment the reward function associated with the model in response to not encountering data representing one or more elements of the 2D array while traversing the array in the selected direction; and increment the penalty function associated with the model in response to encountering data representing one or more elements of the 2D array while traversing the array in the selected direction. The processor is configured to execute the instructions to determine whether the data encountered while traversing the array in the selected direction represents one of the elements of the 2D array or represents a joint between two elements of the 2D array. The processor is configured to execute the instructions to traverse the array in a different direction in response to determining that the data encountered represents one of the elements of the 2D array. The processor is configured to execute the instructions to traverse through the joint between the two elements and continue traversing the array in the selected direction in response to determining that the data encountered represents a joint between two elements of the 2D array. The processor is configured to execute the instructions to recognize one or more of the elements of the 2D array segmented by traversing the array.

In other features, the processor is further configured to execute the instructions to update the model based on one or more of the incremented reward and penalty functions and based on the pixel data of the 2D array.

In other features, the processor is further configured to execute the instructions to select the location based on an a priori information about the pixel data of the 2D array.

In other features, the elements of the 2D array include alphanumeric characters.

In other features, the processor is further configured to execute the instructions to select one or more additional locations in the array based on the pixel data; traverse the array from the selected location and the one or more additional locations in parallel in the selected direction to segment the elements of the 2D array; and recognize a plurality of the elements of the 2D array segmented by traversing the array from the one or more additional locations.

In other features, the processor is further configured to execute the instructions to select a total number of locations including the selected location and the one or more additional locations based on the pixel data.

In other features, the processor is further configured to execute the instructions to select spacing between the selected location and the one or more additional locations based on the pixel data.

In other features, the processor is further configured to execute the instructions to select widths of paths for traversing the array from the selected location and the one or more additional locations based on the pixel data.

In other features, the processor is further configured to execute the instructions to select the widths to be equal.

In other features, the processor is further configured to execute the instructions to select at least one of the widths to be different than others of the widths.

In other features, the processor is further configured to execute the instructions to, prior to selecting the location, receive the pixel data of the 2D array; detect locations of the elements in the 2D array; and correct one or more of orientation, intensity, and scaling of the 2D array.

In other features, the processor is further configured to execute the instructions to recognize the one or more of the elements of the 2D array using respective classifiers.

In still other features, a method for partitioning a two-dimensional (2D) array and recognizing elements of the 2D array comprises selecting a location in an array comprising pixel data of the 2D array; and selecting a direction in which to traverse the array from the selected location to segment the elements of the 2D array, the selected direction being based on data surrounding the selected location and based on a model generated by segmenting a plurality of 2D arrays. The method further comprises incrementing a reward function associated with the model in response to not encountering data representing one or more elements of the 2D array while traversing the array in the selected direction. The method further comprises incrementing a penalty function associated with the model in response to encountering data representing one or more elements of the 2D array while traversing the array in the selected direction. The method further comprises determining whether the data encountered while traversing the array in the selected direction represents one of the elements of the 2D array or represents a joint between two elements of the 2D array. The method further comprises traversing the array in a different direction in response to determining that the data encountered represents one of the elements of the 2D array. The method further comprises traversing through the joint between the two elements and continue traversing the array in the selected direction in response to determining that the data encountered represents a joint between two elements of the 2D array. The method further comprises recognizing one or more of the elements of the 2D array segmented by traversing the array using respective classifiers.

In other features, the method further comprises updating the model based on one or more of the incremented reward and penalty functions and based on the pixel data of the 2D array.

In other features, the method further comprises selecting the location based on an a priori information about the pixel data of the 2D array.

In other features, the method further comprises selecting one or more additional locations in the array based on the pixel data; traversing the array from the selected location and the one or more additional locations in parallel in the selected direction to segment the elements of the 2D array; and recognizing a plurality of the elements of the 2D array segmented by traversing the array from the one or more additional locations.

In other features, the method further comprises selecting a total number of locations including the selected location and the one or more additional locations based on the pixel data.

In other features, the method further comprises selecting spacing between the selected location and the one or more additional locations based on the pixel data.

In other features, the method further comprises selecting widths of paths for traversing the array from the selected location and the one or more additional locations based on the pixel data.

In other features, the method further comprises, prior to selecting the location, receiving the pixel data of the 2D array; detecting locations of the elements in the 2D array; and correcting one or more of orientation, intensity, and scaling of the 2D array.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 1A and 1B show a method for segmenting data captured from an image and recognizing the segmented data according to the present disclosure;

FIGS. 2A-2C show an example of image capture and preprocessing;

FIG. 4 shows a system framework for an active character segmentation method according to the present disclosure;

FIGS. 6A-6C show an example of segmentation and character recognition performed using the active character segmentation method according to the present disclosure;

FIG. 9 shows examples of traffic signs that can be correctly read using the active character segmentation method according to the present disclosure;

In the drawings, reference numbers may be reused to identify similar and/or identical elements.

DETAILED DESCRIPTION

Figure 3:
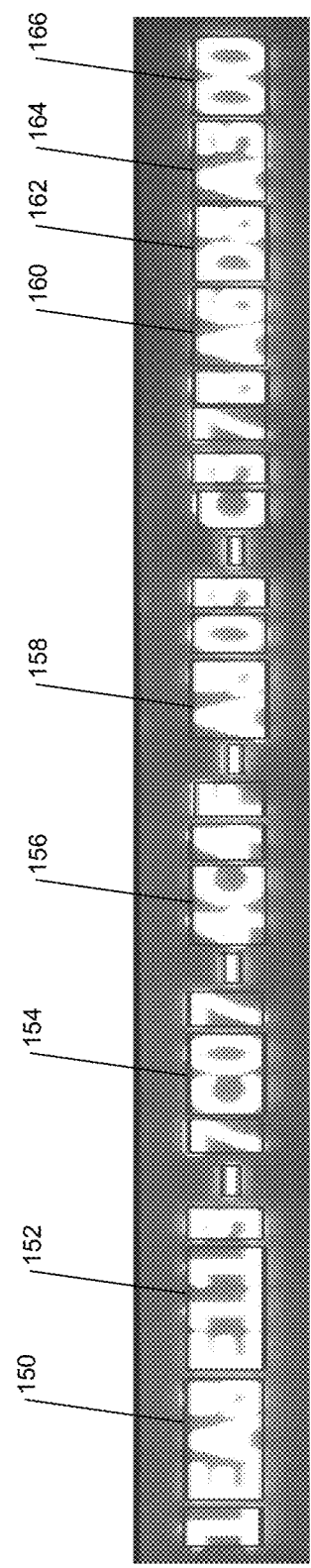
FIG. 3 shows another example of a captured image including joined characters.

The present disclosure proposes a new method for reliable segmentation of scanned data (e.g., alphanumeric characters) using deep reinforcement learning. The segmentation strategy is modeled as an active learning process in a reinforcement learning framework. Once the model is trained, the segmentation can be implemented in parallel. The method is implemented as part of a system that performs optical character recognition (OCR). The method is performed on pixel data captured by scanning an object (e.g., a label, a document, a road sign, etc.). The method segments the captured image and detects and identifies elements of the captured image (e.g., a character sequence such as a 32 digit hexadecimal Bitlocker code, a VIN number, or a part number etc.).

The system that implements the method includes modules to perform the following operations: a) capture an image of a region of interest with an appropriate application, b) detect the text (e.g., a hexadecimal code or VIN number) location in the captured image, c) preprocess the image to correct rotation/scaling/intensity, d) segment out characters using reinforcement learning, and e) apply classifiers to recognize the segmented characters. The present disclosure proposes a new method for segmenting the characters from a captured image. The proposed segmentation scheme works well especially when touching or joined (i.e., interconnected) characters exist in the captured image.

One of the challenges in OCR is accurate segmentation of characters especially when two or more characters are touching each other. When performing OCR in a text document, over/under segmented characters can be automatically completed by using contextual information. However, when reading some types of data such as a Bitlocker code or a VIN number, automatic completion is not possible since each character in the code is independent, and there is no contextual information. The present disclosure proposes a new character segmentation method that is better and more robust than existing open source methods to address the challenges that occur when touching characters exist.

The proposed segmentation strategy is modeled as active learning process in a reinforcement learning framework. The proposed segmentation model can be implemented in parallel, which significantly improves the computational efficiency of the character segmentation process. The proposed segmentation model is updated online with ongoing reinforcement learning performed during the implementation process.

The proposed segmentation strategy can be used in OCR applications (e.g., in OCR applications in the areas of Bitlocker codes, autonomous vehicles, fleet management, manufacturing, etc.) and can be implemented in the following steps: a) Model training and testing: This step includes training the segmentation model with sufficient data and building a policy network that outputs optimal segmentation decisions; b) Implementing segmentation: Once the model is trained, this step includes implementing segmentation in parallel at different locations of the image; and c) Online learning and updating of the model: In this step, the proposed segmentation model keeps improving itself by ongoing learning from the implementation process.

Figure 16:
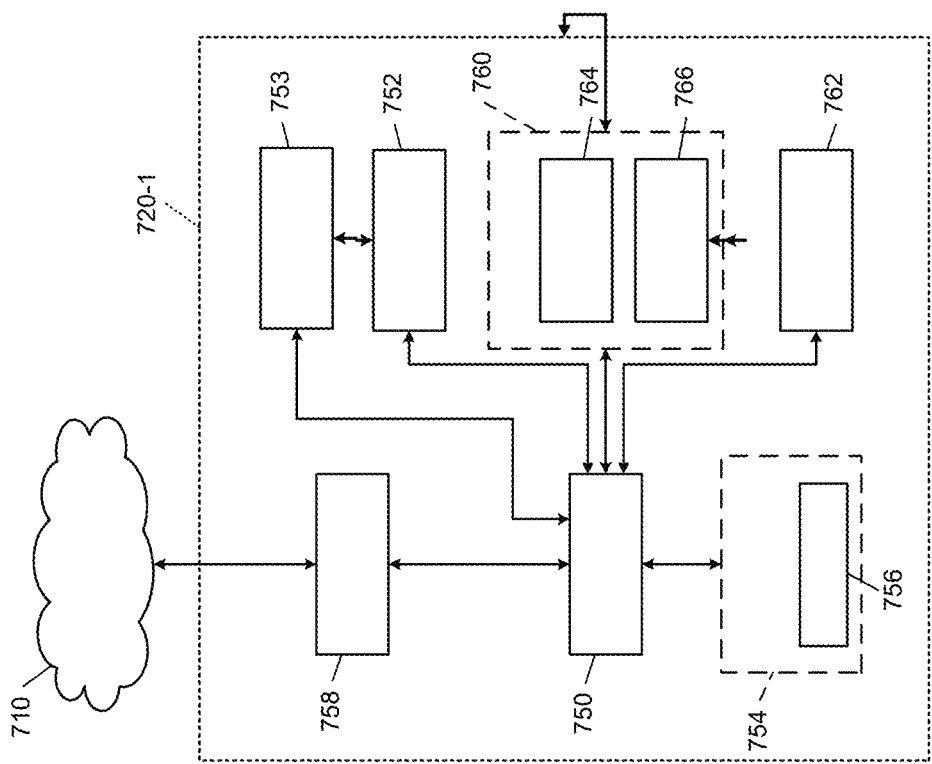
FIG. 16 shows a simplified example of a client device used in the distributed computing system.
Figure 17:
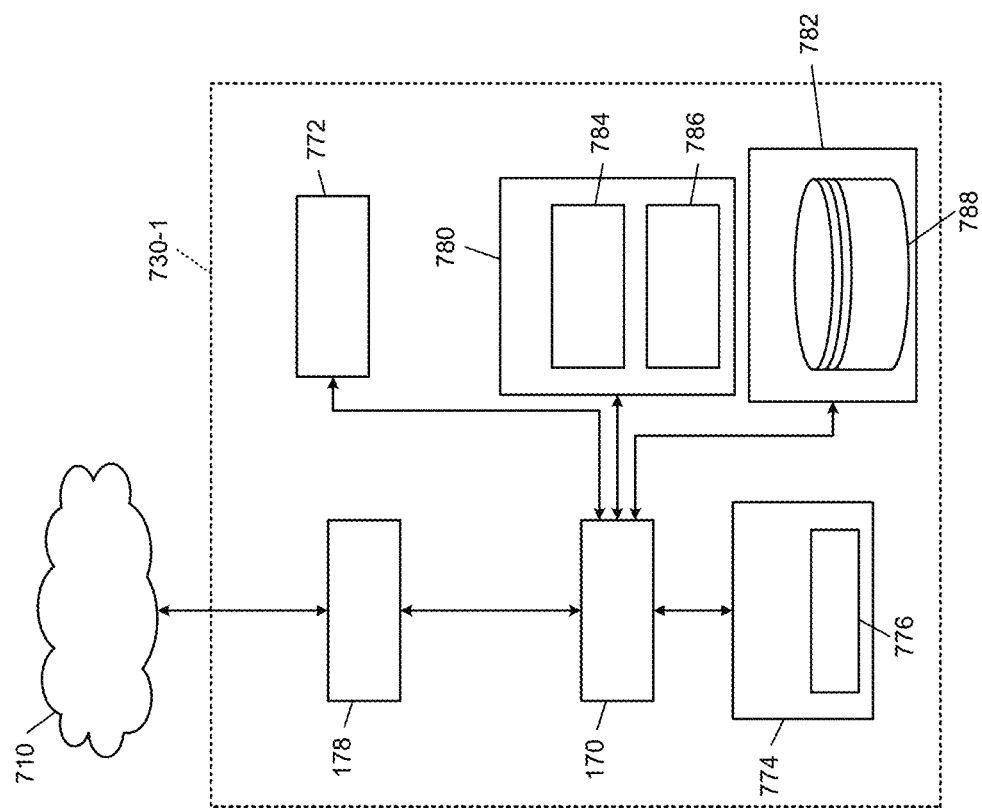
FIG. 17 shows a simplified example of a server used in the distributed computing system.

The present disclosure is organized as follows. Initially, the segmentation methods of the present disclosure are described in detail. Subsequently, with reference to FIGS. 1-9, various examples of generating and training the segmentation model and updating the model while performing segmentation using the segmentation methods are described. FIGS. 10-14 show flowcharts of the segmentation methods of the present disclosure. FIGS. 15-17 show a client-server architecture in which the segmentation systems and methods of the present disclosure can be implemented.

The proposed segmentation system uses a neural network based approach to segmenting characters in an image. An agent traverses a space (e.g., a two dimensional array) comprising pixel data of the image in different directions (right, left, up, down) to carve out characters in the image. The agent decides, based on its local surroundings in the space, the direction in which to traverse the space to carve out characters in the space. The agent avoids hitting characters while traversing the space to maximally segment the characters in the space. A neural network based approach is used to perform these operations. A policy based on reward and penalty functions is used to guide the agent through the space. The agent is rewarded when the agent traverses the space in a direction without hitting a character. The agent is penalized when the agent hits a character.

Typically, OCR includes two tasks: segmentation, which involves carving out individual characters in an image; and classification, which classifies the carved out characters (e.g., as alphabets or numbers). The present disclosure deals with the task of segmentation. Sometimes adjacent characters or objects in an image can be joined to each other (i.e., touching each other). The present disclosure provides the best way of segmenting connected objects or characters in images.

In the proposed method, the agent is assigned an initial location in the image. Based on the pixel layout in an area surrounding the agent, the agent decides to move in a particular direction within the area. The agent moves in the selected direction such that the agent does not hit a dark spot (e.g., a black pixel or a darker color in the image), which indicates presence of a character. The agent continues to move in the selected direction so long as the agent encounters light spots (e.g., white background or a lighter color in the image), which indicates absence of a character. The agent is penalized on hitting a dark spot, and the agent is rewarded on not hitting a dark spot (or not hitting a character).

The penalty and reward functions guide the movement of the agent. The agent changes direction of movement on being penalized for hitting a dark spot. The agent continues to move in the selected direction on being rewarded for not hitting a dark spot. Thus, the agent finds the most efficient way to traverse the area in the selected direction (e.g., from top to bottom of an array) and segments the characters on either side (in this example, to the left and right) of the selected direction.

When the agent hits a dark spot, sometimes the dark spot may be where two adjacent characters are joined. The agent finds the most efficient way to get through the joint and yet avoids cutting through a character. The agent determines whether a dark spot is a joint or a character as follows. When the agent hits a dark spot, the agent tries to cut through the dark spot quickly. The agent determines if the dark spot can be traversed within a predetermined time period (or within a predetermined increase in the penalty function), in which case the agent concludes that the dark spot is a joint and not a character, and continues in the selected direction. Otherwise, the agent concludes that dark spot is not a joint but a character and changes direction to avoid cutting through the character.

In this manner, the agent traverses a two dimensional array of pixels. The array can include a variety of data. Non-limiting examples of the data include black pixels on white background (e.g., alphanumeric text), RGB values in a cell (e.g., a colored image), data from a grid based array (e.g., RADAR or LIDAR data), numeric representation of data derived from an instrument (e.g., a DNA sequencer), etc.

The agent has a policy network. The policy network tells the agent how (i.e., in which direction) to traverse the array. The agent can traverse the array incrementally in a cell-by-cell manner with three degrees of freedom. The agent can also traverse the array with two degrees of freedom (horizontally and vertically).

The agent is rewarded incrementally for making a step across (i.e., moving in the correct direction in) the array without hitting a dark spot. The agent is penalized when the agent gets closer to or intersects a cell in the array that contains non-background information (e.g., a dark spot) while navigating through (i.e., traversing) the array. For example, the cell may include a binary value 0/1 indicating whether the cell is dark or not. If the cell that the agent is touching is dark, the agent is penalized.

The penalty can also be based on information surrounding the cell. For example, the penalty can be based on whether the surrounding cells or pixels are also dark, or whether there are more dark pixels than light pixels around the cell (i.e., based on pixel density). The surrounding information can be used to detect joints between adjacent characters and to traverse through the joints so long as the penalty function increases within a predetermined threshold. The surrounding information can be described in terms of a metric or a function (e.g., linear, logarithmic, etc.) of the data in the array and can be used to determine or adjust the direction in which the agent traverses to efficiently segment the data in the array.

The policy or model that controls the agent learns (trains itself) over time based on a deep neural network. Typically, rules are hard coded in such policies, and the rules are manually adjusted based on the performance of the system being controlled. In contrast, in the present disclosure, the policy that controls the movements of the agent is adaptive and automatically learns or adapts over time during use to find more efficient ways to traverse different arrays. The policy adapts based on the reward and penalty functions. In other words, the reward and penalty functions are used as reinforcement learning mechanisms for efficiently segmenting or partitioning the data in an array.

For example, if the reward function increases as the agent traverses an array in a particular direction, the policy controlling the agent learns that a similar direction should be used to traverse arrays with similar type of data. Conversely, if the penalty function increases as the agent traverses an array in a particular direction, the policy controlling the agent learns that a similar direction should not be used to traverse arrays with similar type of data. Thus, the reward and penalty functions are used as reinforcement learning mechanisms for efficiently segmenting or partitioning the data in different arrays.

In various implementations, one or more agents can be used to segment an array. For example, a single agent can begin traversing an array at top left position of the array, traverse the array from top to bottom, shift to the right and move to the top of the array, and repeat the process until the entire array is processed. Alternatively, a plurality of agents can be spaced apart and located at the top of the array and can traverse the array from top to bottom in parallel (i.e., at the same time). The agents can be spaced evenly or unevenly depending on the type of data in the array. For example, the spacing may be even if the data is of a fixed format (e.g., alphanumeric); and the spacing may be uneven if the data is without a fixed format. Further, the width of each agent (i.e., width of each path followed to traverse the array) may differ. For example, fixed width agents may be used if the data is of a fixed format (e.g., alphanumeric), and variable width agents may be used when the data has a random format. Other variations and configurations of the agents are contemplated and are within the scope of the present disclosure.

One or more of these methods (single agent, multiple fixed width agents, multiple variable width agents, etc.) can be used on a single array. Results (i.e., output) of each method can be used to confirm the accuracy of the output (e.g., if outputs of all the methods match, the output can be considered 100% accurate). Further, the results can be used for reinforcement learning. For example, the method or methods that produce accurate results for a type of data can be preferred for scanning arrays containing similar data. Further, the results can be used to learn agent positioning (i.e., where to place an agent in the array, or determining location from which to begin segmenting). All of the learning can be based on respective reward and penalty functions used by the various agents.

The placement of the agent or agents in an array can depend on the type of data in the array. For example, the number of agents, the spacing between the agents, the width of widths of the agent or agents, and so on may depend on the type of data in the array. For example, the number of agents may be proportional to the size of the array; the agents may be placed in the array based on an a priori information about the distribution of the data in the array; the agents may be randomly placed in the array; and so on. In some implementations, a separate policy may be used to place the agent or agents in the arrays.

The teachings of the present disclosure can be used in many applications For example, the teachings can be used for reading images off screens, images in high noise context (e.g., images captured by vehicle cameras), images that are relatively small and close together, and so on. The teachings are not limited to arrays including binary data representing black and white information. The teachings can also be extended to arrays containing data representing color information (e.g., data representing RGB or CMY color schemes). In such arrays, the partitioning can be performed by identifying contrasting colors, and the reward/penalty functions can be defined based on bias towards selected colors.

The teachings can also be used to partition data read by cameras of autonomous vehicles (e.g., road signs). The data can be partitioned in parallel using the one or more partitioning methods of the present disclosure, and OCR can be performed on the partitioned data on the fly (i.e., in real time). The OCR output can be used as feedback to control the autonomous vehicles.

FIGS. 1A and 1B broadly illustrate a method 10 for segmenting data captured from an image and recognizing the segmented data. For example, the method 10 can be executed as one or more applications executed on a client device, a server, or a combination of a client device and a server communicating via a network in a client-server architecture as shown in FIGS. 15-17.

In FIG. 1A, an image of a region of interest is captured using an appropriate application (e.g., at a client device). For example, a camera or a scanner (associated with a client device, which may include a vehicle, etc.) may capture a part number from an assembly, a VIN number of a vehicle, a license plate number of a vehicle, a road sign, etc.

At 12 (e.g., at the client device or at a server), when the captured image is received, the location or locations of the text in the captured image is/are detected. Additionally, the captured image is pre-processed (e.g., to correct rotation, scaling, intensity, etc.). At 14 (e.g., at the server), the characters in the captured image are segmented using one or more reinforcement learning methods described above.

At 16 (e.g., at the server), the segmented characters are recognize using one or more classifiers (e.g., an alphabet classifier is used to recognize alphabet characters; a numeric classifier is used to recognize numbers, etc.). The recognized characters may be forwarded for further use and/or processing. For example, the recognized characters from a road sign may be used to control an autonomous vehicle; a recognized part number or VIN number may be used for inventory control, assembly, or for service purposes; etc.

In FIG. 1B, the steps implemented in the segmentation process are shown. At 18 (e.g., at one or more servers), the model used for segmentation at 14 is initially trained (i.e., prior to use at 14) with sufficient data (e.g., by segmenting a plurality of images as described above), and a policy network (explained above and below with reference to FIGS. 4 and 5) is built to output optimal segmentation decisions. For example, the segmentation decisions may include determining the direction in which to segment a type of data; determining the criteria, thresholds, metrics, and/or functions used to distinguish a joined character from a character; etc.

At 14, once the model is trained, the segmentation can be implemented in parallel at different locations of the captured image. At 20, the model continues to improve or update itself based on ongoing learning from use (segmentation) at 14. At 14, the updated model is available for use to segment the captured image.

FIGS. 2A-2C show an example of image capture and preprocessing. As an example, Bitlocker drive encryption is a data protection feature available in Windows operating systems. Many corporate users use Bitlocker on company laptops to address threats of data theft or exposure from unauthorized access. When an employee loses a Bitlocker PIN, the application generates a Recovery-Key-ID which is then passed to IT helpdesk to receive an actual Recovery-Key. This process is prone to errors and is often inefficient and unreliable. One way to automate the process is to have the employee take a photo of the key ID presented on the laptop screen and upload the image to helpdesk through a mobile app where the key can be received automatically.

FIG. 2A shows an example of a captured raw image (e.g., from data displayed on a screen). Captured images like these, however, can have irregularities where two or more characters can be touching or joined. The segmentation method of the present disclosure accurately segments the characters in the image, including the connected characters in the image, and improves the segmentation of the captured image, which results in an improved character recognition performance. FIG. 2B shows an example of a portion of the captured image after preprocessing, showing some joined elements, which upon segmentation and recognition using the methods of the present disclosure yields the accurate result shown in FIG. 2C.

In FIG. 2A, the captured image, which shows a photo of a computer screen, includes a portion 100. The portion 100 is the data of interest (here, the recovery key ID to be sent to helpdesk). The portion 100 includes alphanumeric characters. The captured image including the portion 100 is sent to IT helpdesk, where the captured image is preprocessed to extract the portion 100.

In FIG. 2B, after preprocessing, some of the characters in the portion 100 are joined as shown at 102-110. The portion 100 is segmented according to the present disclosure as describe above, and the segmented characters are correctly recognized using appropriate classifiers. FIG. 2C shows the correctly recognized characters 112 of the key ID, based on which an actual key is generated and returned to the user.

FIG. 3 shows another example of a captured image including many joined characters as shown at 150-166. The characters in the image, including the joined characters, can be segmented and recognized as follows.

FIG. 4 shows a system framework for the active character segmentation method according to the present disclosure. The image segmentation problem (shown at 5) is modeled as an active learning and decision process as follows. An agent (shown at 4, e.g., as an autonomous vehicle) is traversing the image from top to bottom of the image and is trying to avoid touching any dark region. The allowed movement actions (or degrees of freedom) for the agent are defined and shown at 1. The decisions regarding which direction to traverse are made based on a local image state (i.e., local surroundings of the agent's location, shown at 2) and based on a defined reward function (shown at 3, e.g., Reward=Average Gray Difference+No. of Steps). The objective of the agent is to maximize the total reward by learning a policy network (shown at 7) that maps the local image state (an input on the left of the policy network) to an optimal action (an output on the right on the policy network) that helps achieve the objective. The resultant traversing trajectory (shown at 6) of the agent is the final segmentation.

Additionally, while not shown, the decisions regarding which direction to traverse may also be made based on the local image state and a defined penalty function. The objective of the agent can be to minimize the total penalty by learning a policy network that maps the local image state to an optimal action that helps achieve the objective.

Figure 5:
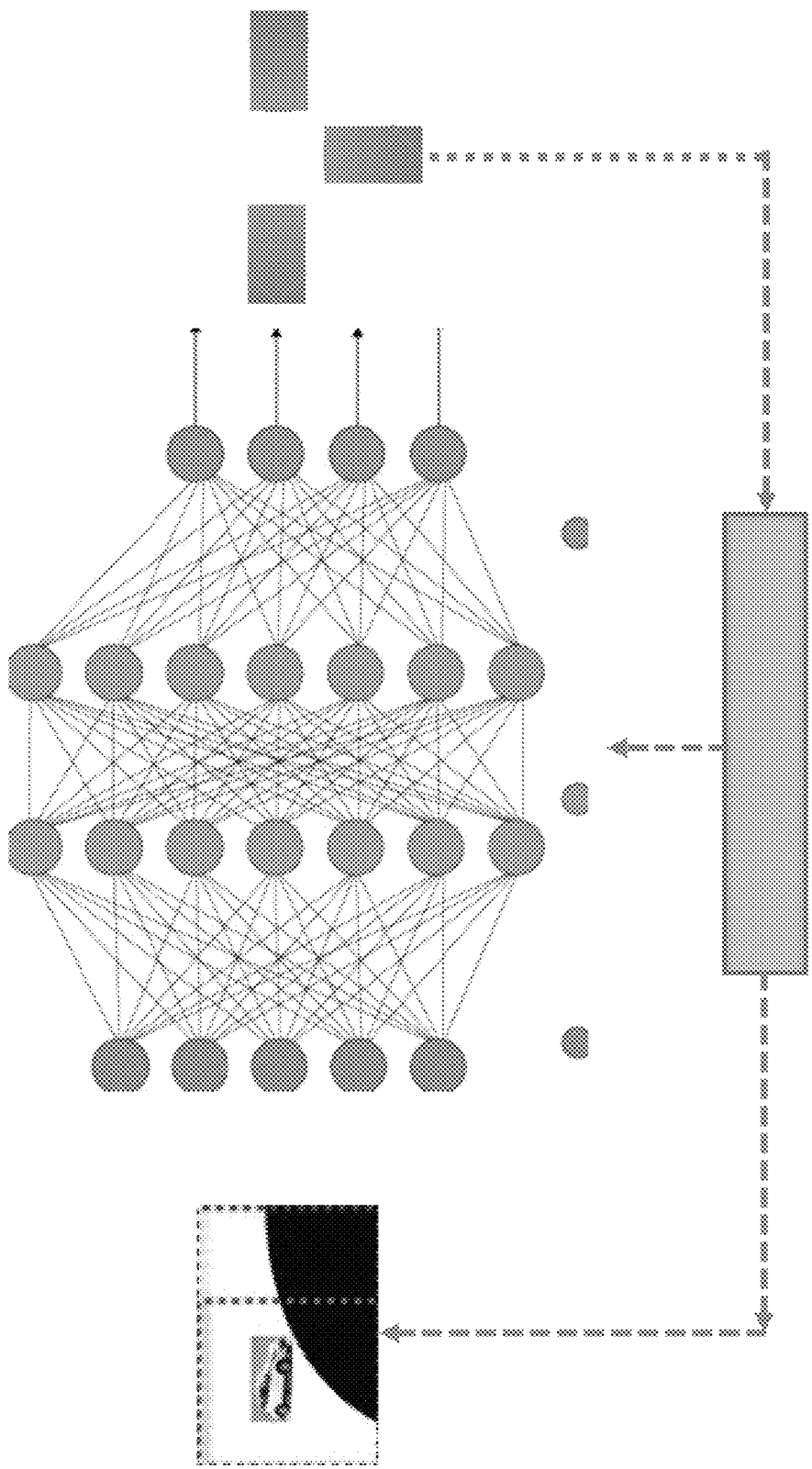
FIG. 5 shows a training and learning process for the active character segmentation method according to the present disclosure.

FIG. 5 shows the training and learning process for the active character segmentation method according to the present disclosure. The training process is implemented to obtain or learn an optimal policy network, which is used to control the movement of the agent while traversing an image. The model used for segmentation utilizes the policy network for providing decisions to control the direction of movement of the agent during the segmentation process.

The policy network has a set of inputs and a set of outputs. The inputs include a location of the agent and data surrounding the location when the agent is traversing an image. The inputs include location of the agents and data surrounding the locations when multiple agents are used. For a given agent location, the policy network provides an output that directs further movement of the agent. The model is initially trained and the policy network is generated prior to implementation by traversing many images. While traversing the images, the reward and penalty functions are used to initially define and further refine the policy network during use. The policy network may be implemented as a controller on a server (see an example of a server shown and described with reference to FIGS. 15-17).

In use, when the policy network provides a directional output to control the next move of the agent, the reward or penalty function is calculated, and the policy network is updated on the fly based on the value of the reward or penalty function. The direction of the agent is determined based on the value of the reward or penalty function. The updated policy network is used for controlling the direction of the agent. The training is an ongoing process and continuously improves the segmentation quality while in use.

FIGS. 6A-6C show an example of segmentation and character recognition performed as described above. FIG. 6A, which is the same as FIG. 3, shows an example of an image 200 that is captured and preprocessed. The image 200 shown in the example includes alphanumeric characters. Some of the characters in the image 200 are joined as shown at 202-218. FIG. 6B shows an example of segmenting the image 200 performed according to the present disclosure as describe above. Examples of segmenting are shown at 220-224. FIG. 6C shows the alphanumeric characters 226 correctly recognized after the image 200 is segmented according to the present disclosure and the segmented characters are recognized using appropriate classifiers as describe above.

Figure 7A:
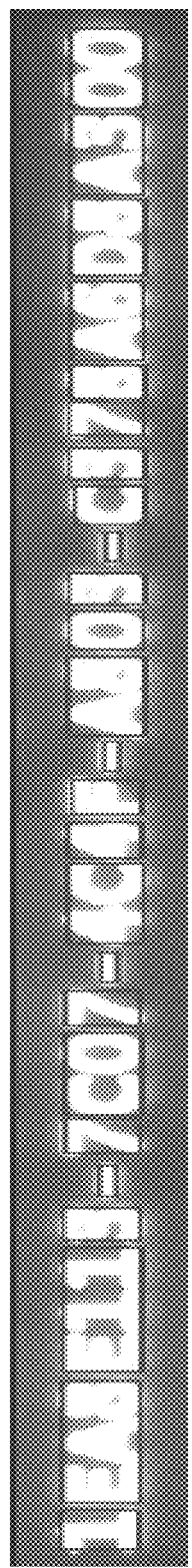
FIGS. 7A-7B show an example of segmentation of an image including joined characters performed according to the present disclosure.
Figure 7B:
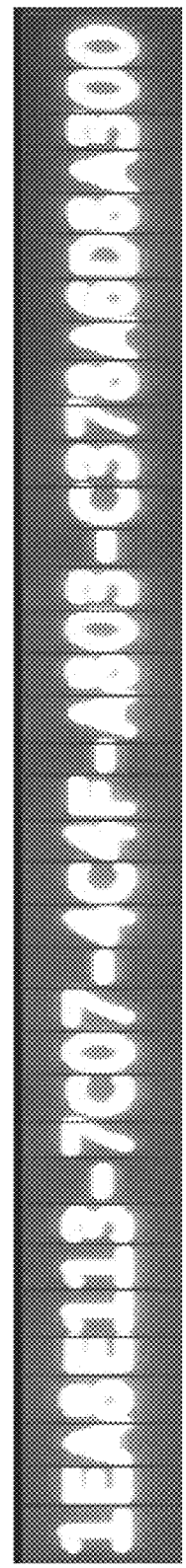

FIGS. 7A-7B show the results of segmentation performed according to the present disclosure. FIG. 7A, which is the same as FIG. 6A, again shows the image with joined characters. FIG. 7B shows the elements of the image segmented correctly using the segmentation method of the present disclosure. Note in FIG. 7B that the joined characters in the image are also correctly segmented using the segmentation method of the present disclosure.

Figure 8A:
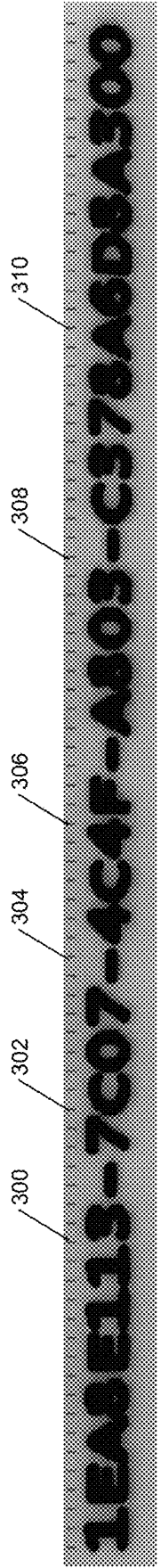
FIGS. 8A-8D show an example of segmentation of an image performed by multiple agents in parallel according to the present disclosure.
Figure 8B:
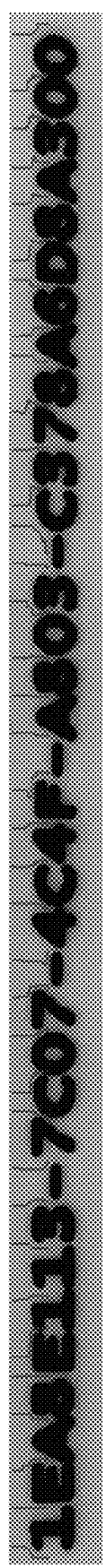
Figure 8C:
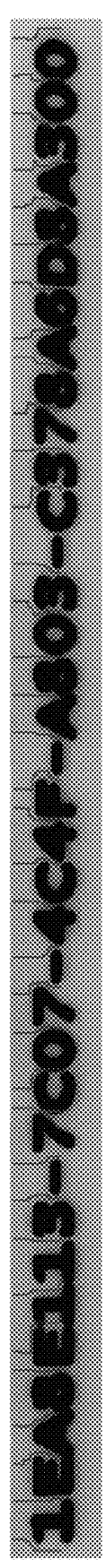
Figure 8D:
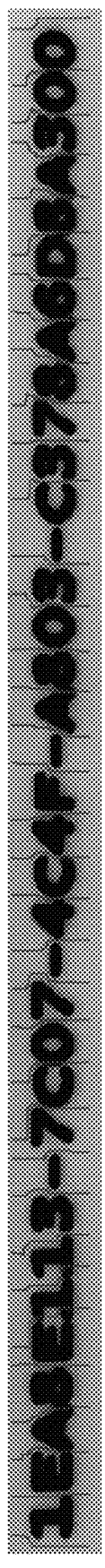

FIGS. 8A-8D show an example of segmentation of an image performed by multiple agents in parallel according to the present disclosure. In FIG. 8A, which shows the same image shown in FIG. 6A, several agents can be used to segment the elements (characters in this example) of the image. Examples of the locations where the agents can begin segmenting are shown at 300-310. Note that only a few locations are numbered and that there are additional locations similar to those numbered from where additional agents are launched as shown in FIGS. 8B-8D.

In FIG. 8B, each agent begins segmenting in parallel (i.e., at respective locations at the same time) along a top to bottom path in the image (i.e., in an array of image data representing the elements of the image). In FIGS. 8B-8D, the progress of each agent is shown until the segmentation is complete. Also shown is how the direction in which the agents traverse along respective paths changes so as to not cut through the elements except where two adjacent elements are joined. The segmentation by each agent is performed as explained above.

In some instances, depending on the type of data in the array, some of the agents may traverse along paths of different widths. The separation between the agents may also vary depending on the type of data in the array. In some instances, instead of employing multiple agents, only one agent may be used, and the same agent may be moved to the right to traverse the array from a different location. In some cases, the width of the path may be changed when the agent is moved to the right. In some implementations, a group of agents may be deployed in parallel to traverse a first portion of the array from a first set of locations, and the entire group may be moved to a second set of locations to traverse a second portion of the array from the second set of locations. Many other variations of agent configurations and deployment are contemplated and are within the scope of the present disclosure.

The segmenting methods described above can be used to recognize elements of images captured from a variety of objects. For example, the captured images may include a VIN number captured from a vehicle, a part unique number (PUN, including OEM number, batch number, rating data, etc.) captured from a service part or an assembly, a MAC address or an IP address captured from a communication device, markings printed on integrated circuit packages, road signs (e.g., road names, traffic signs, etc.; see FIG. 9) captured by a vehicle camera, and so on. The captured images can be preprocessed, and the elements of the images can be segmented and recognized as described above.

FIG. 9 shows examples of traffic signs that can be correctly read and used to improve navigation performance of autonomous vehicles. While most traffic signs are distinct by their shape or symbol, some require reading and interpreting enforced rules. Adding to the complexity, these signs often include date and time limits which are critical for traffic safety and also can change anytime due to accidents, road closures, etc. Autonomous vehicles are expected to interpret these rules and operate accordingly. The segmentation methods of the present disclosure can accurately segment and identify the road signs and improve the navigation performance of autonomous vehicles.

Segmenting and recognizing data in the examples of images mentioned above can significantly improve misreading or misdetection of data in these images, which in turn can significantly improve various technological fields. For example, the technological fields may include but are not limited to manufacturing and assembly of various products (e.g., vehicles, computers, etc.), control of computer systems (e.g., simplifying and automating exchange of security data), control of autonomous vehicles, and so on. Many other applications and improvements are contemplated and are within the scope of the present disclosure.

Figure 10:
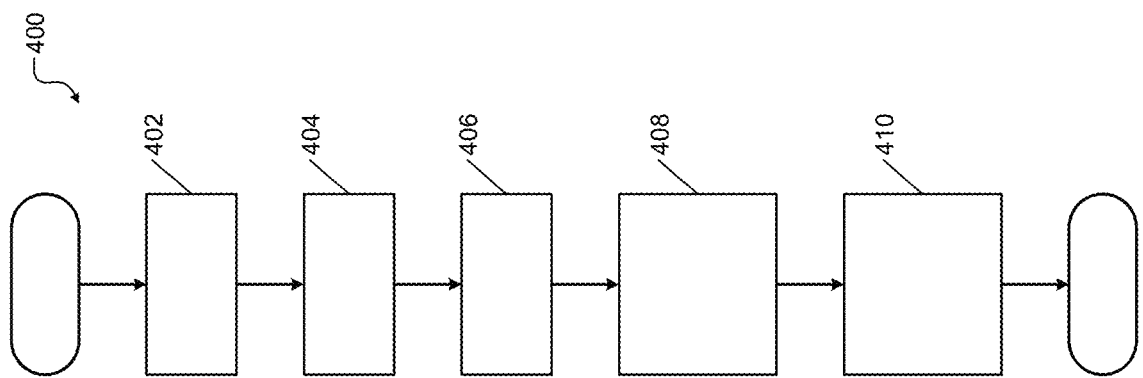
FIG. 10 shows a flowchart of a method for segmenting and recognizing elements of an image according to the present disclosure.

FIG. 10 shows a flowchart of a method 400 for segmenting and recognizing elements of an image according to the present disclosure. For example, the method can be performed by one or more applications executed on a client device and/or a server shown in FIGS. 15-17.

At 402, the method captures an image comprising elements (e.g., text) to be identified. At 404, the method detects locations of the elements (e.g., text) in the captured image. At 406, the method preprocesses the captured image. At 408, the method segments the elements (e.g., characters in the text) according to the segmenting schemes described above. At 410, the method recognizes the segmented elements using appropriate classifiers to identify the elements.

Figure 11:
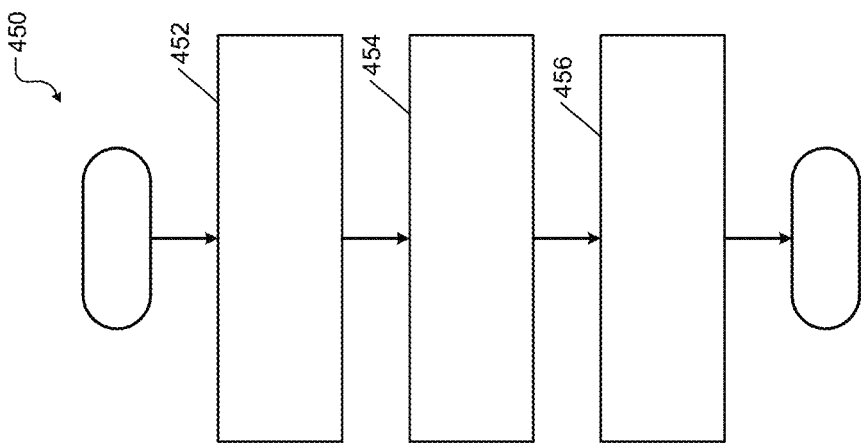
FIG. 11 shows a flowchart of a method for segmenting and recognizing elements of an image where the segmenting is performed in parallel according to the present disclosure.

FIG. 11 shows a method 450 for segmenting and recognizing elements of an image according to the present disclosure. The method 450 performs the segmenting in parallel. For example, the method can be performed by one or more applications executed on one or more servers shown in FIGS. 15-17.

At 452, the method trains a segmentation model and build a policy network to output optimal segmentation decisions as described above. At 454, the method implements segmentation in parallel at different locations in an image as explained above. At 456, the method continues to learn and refine the policy network and updates the segmentation model during implementation as described above.

Figure 12:
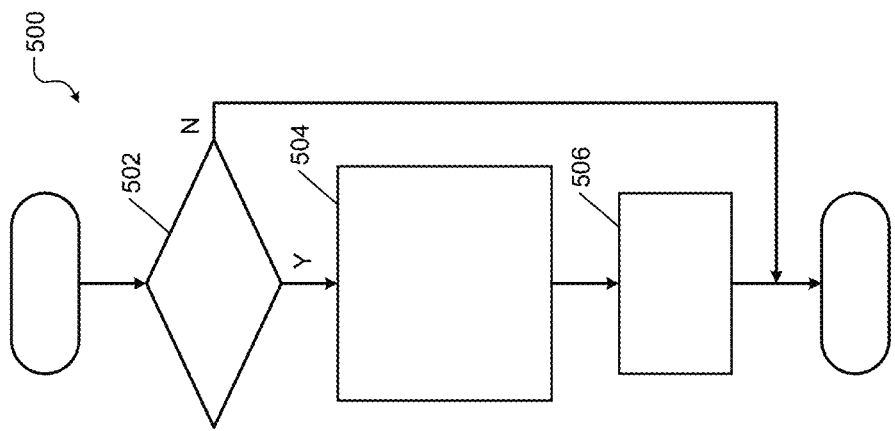
FIG. 12 shows a flowchart of a method for segmenting an array in parallel according to the present disclosure.

FIG. 12 shows a method 500 for segmenting an array in parallel according to the present disclosure. For example, the method can be performed by one or more applications executed on one or more servers shown in FIGS. 15-17.

At 502, the method determines whether to segment an array in parallel (e.g., based on the data in the array). At 504, if the array is to be segmented in parallel, the method determines various parameters associated with the agents to be used in parallel. For example the parameters can include one or more of the following: the number of agents to be deployed, the widths of the paths to be traversed across the array by the agents, the spacing between the agents, and locations from which the agents will begin traversing the array in parallel. At 506, the method segments the array in parallel using the agents deployed and configured according to the determined parameters.

Figure 13:
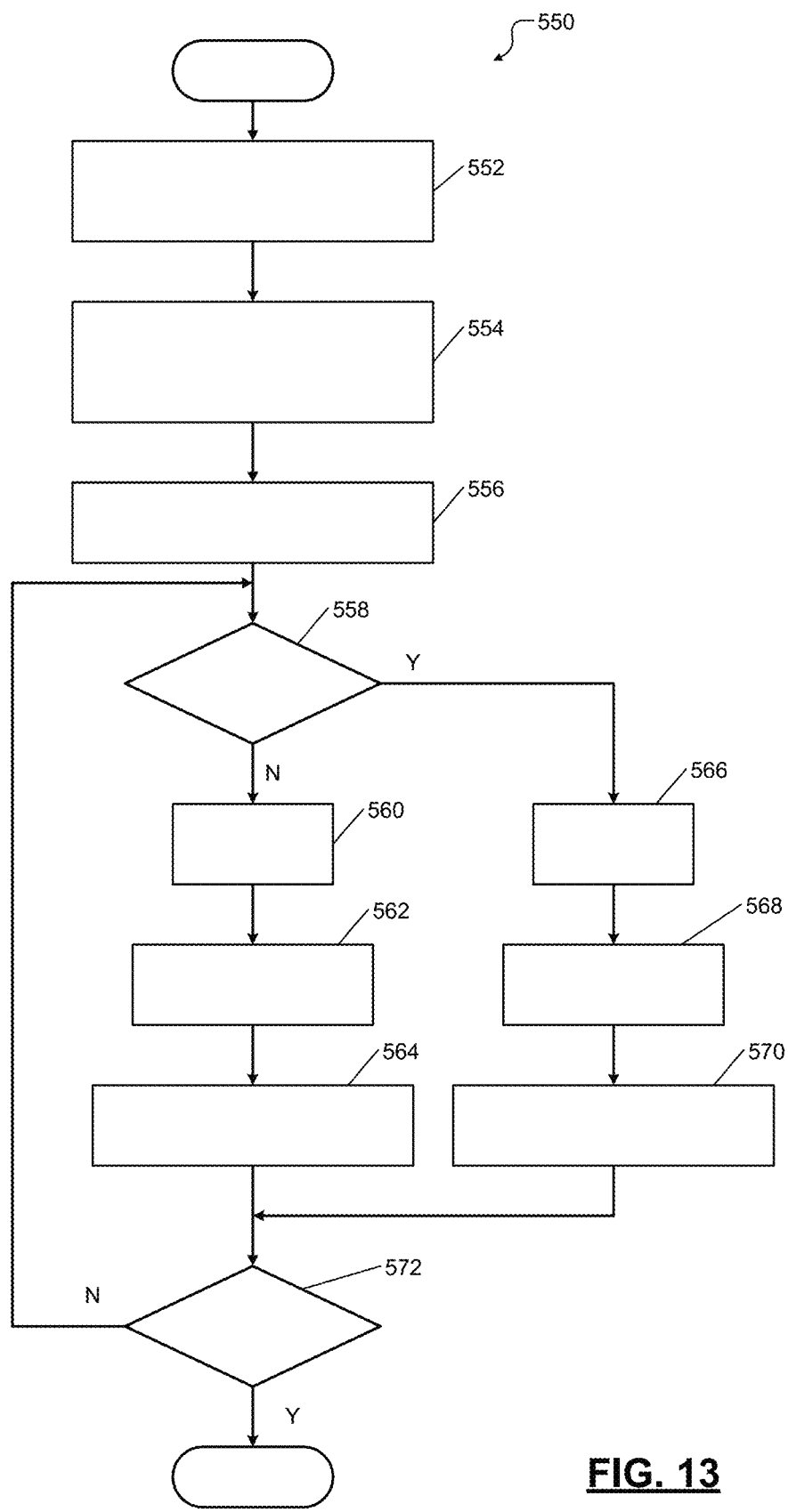
FIG. 13 shows a flowchart of a method for segmenting an array and updating a model used for segmenting the array according to the present disclosure.

FIG. 13 shows a method 550 for segmenting an array and updating a segmentation model during the segmenting process according to the present disclosure. For example, the method can be performed by one or more applications executed on one or more servers shown in FIGS. 15-17.

At 552, the method determines a location in an array from which to begin traversing the array. The array comprises pixel data representing elements in an image to be recognized. At 554, the method determines a direction in which to traverse the array based on the data surrounding the location and based on a segmentation model. At 556, the method begins traversing the array from the selected location in the selected direction.

At 558, the method determines if a dark spot is encountered during the traversal. At 560, if a dark spot is not encountered, the method increments a reward function. At 562, the method updates the knowledge base or experience pool used for ongoing training and continuous improvement of segmentation quality and updates the segmentation model based on the incremented reward function. At 564, the method continues traversing the array and the selected direction.

At 566, if a dark spot is encountered, the method increments a penalty function. At 568, the method updates the knowledge base or experience pool used for ongoing training and continuous improvement of segmentation quality and updates the segmentation model based on the incremented penalty function. At 570, the method changes the direction in which to traverse the array and continues traversing the array and the changed direction.

At 572, the method determines if the entire array is traversed. The method returns to 558 if the entire array is not traversed. The method ends if the entire array is traversed.

Figure 14:
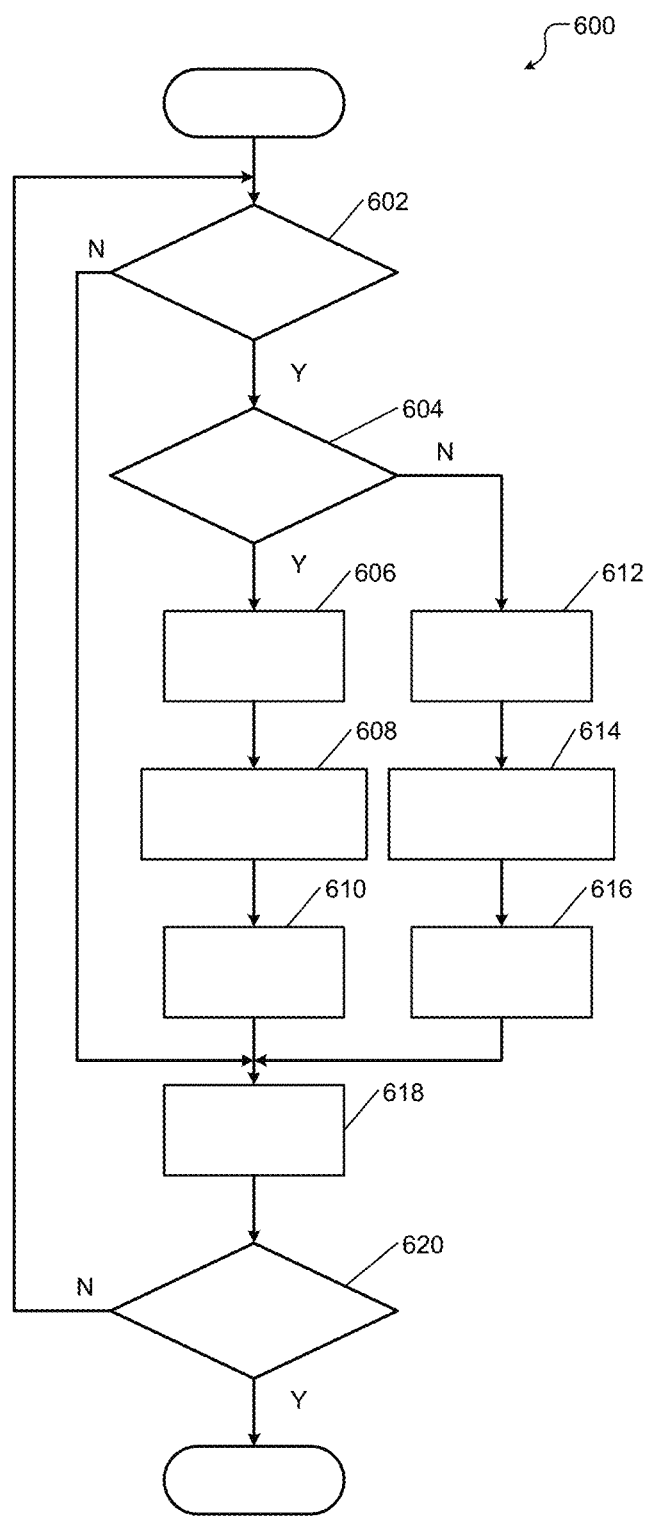
FIG. 14 shows a flowchart of a method for segmenting joined elements in an array according to the present disclosure.
Figure 15:
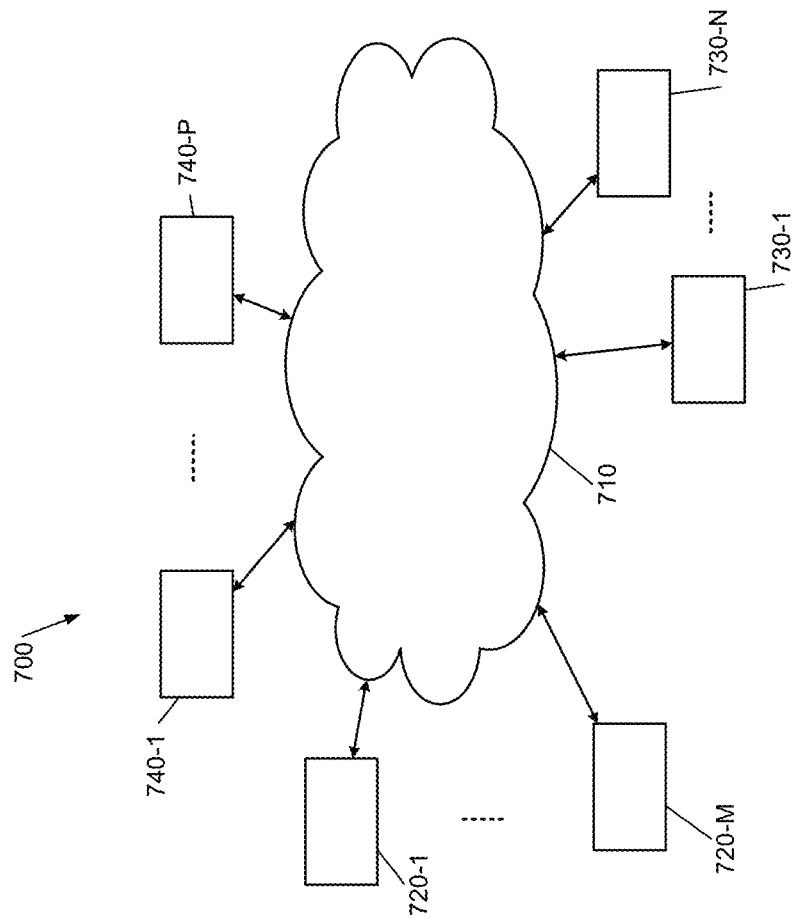
FIG. 15 shows a simplified example of a distributed computing system for implementing the image segmentation and character recognition systems and methods of the present disclosure.

FIG. 14 shows a method 600 for segmenting joined elements in an array according to the present disclosure. For example, the method can be performed by one or more applications executed on one or more servers shown in FIGS. 15-17.

At 602, the method determines if a dark spot is encountered during the traversal. At 604, if a dark spot is encountered during the traversal, the method determines if it can traversed through the dark spot quickly. At 606, if the method can traverse through the dark spot quickly, the method determines that the dark spot is a joint of two elements. At 608, the method updates the knowledge base or experience pool used for ongoing training and continuous improvement of segmentation quality and updates the segmentation model. At 610, the method maintains the direction in which the array is being traversed (i.e., the method traverses through the joint and continues traversing in the same direction).

At 612, if the method cannot traverse through the dark spot quickly, the method determines that the dark spot is an element of the image. At 614, the method updates the knowledge base or experience pool used for ongoing training and continuous improvement of segmentation quality and updates the segmentation model. At 616, the method changes the direction in which to traverse the array (i.e., the method does not traverse through the element).

At 618, if a dark spot is not encountered during the traversal at 602, and after 610 or 616, the method continues to traverse the array without changing the direction. At 620, the method determines if the entire array is traversed. The method returns to 602 if the entire array is not traversed. The method ends if the entire array is traversed.

Below are simplistic examples of a distributed computing environment in which the image segmentation and character recognition systems and methods of the present disclosure described above can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

FIG. 15 shows a simplified example of a distributed computing system 700 that can implement the image segmentation and character recognition systems and methods of the present disclosure as described above. The distributed computing system 700 includes a distributed communications system 710, one or more client devices 720-1, 720-2, . . . , and 720-M (collectively, client devices 720); one or more servers 730-1, 730-2, . . . , and 730-N (collectively, servers 730); and one or more vehicles 740-1, . . . , 740-P; where M, N, and P are integers greater than or equal to one. The distributed communications system 710 may include a local area network (LAN), a wide area network (WAN) such as the Internet, or other type of network. The client devices 720 and the servers 730 may be located at different geographical locations and may communicate with each other via the distributed communications system 710. The client devices 720 and the servers 730 may connect to the distributed communications system 110 using wireless and/or wired connections.

The client devices 720 may include smartphones, personal digital assistants (PDAs), tablets, laptop computers, personal computers (PCs), etc. The client devices 720 may also include autonomous vehicles, cameras, scanners, and other devices capable of capturing various images described in the present disclosure. The servers 730 may provide multiple services to the client devices 720.

The servers 730 may execute one or more software applications and host multiple databases that are relied on by the software applications in providing services to users of the client devices 720. For example, one or more of the servers 730 may execute an application that can preprocess the captured images received from the client devices 720, segment the image data using one or more methods described above, recognize the segmented data, and use the recognized data or return the recognized data to the client devices 720.

FIG. 16 shows a simplified example of the client device 720-1. The client device 720-1 may typically include a central processing unit (CPU) or processor 750, one or more input devices 752 (e.g., a keypad, touchpad, mouse, touchscreen, etc.), a camera or a scanner 753, a display subsystem 754 including a display 756, a network interface 758, memory 760, and bulk storage 762.

The network interface 758 connects the client device 720-1 to the distributed computing system 700 via the distributed communications system 770. For example, the network interface 758 may include a wired interface (for example, an Ethernet interface) and/or a wireless interface (for example, a Wi-Fi, Bluetooth, near field communication (NFC), or other wireless interface). The memory 760 may include volatile or nonvolatile memory, cache, or other type of memory. The bulk storage 762 may include flash memory, a magnetic hard disk drive (HDD), and/or other bulk storage devices.

The processor 750 of the client device 720-1 executes an operating system (OS) 764 and one or more client applications 766. The client applications 766 include an application that accesses the servers 730 via the distributed communications system 710. For example, one of the client applications 766 can send a raw image of an object captured by the camera or scanner 753 to the one or more servers 730. The client applications 766 may also be capable of preprocessing the captured images and then sending the images to the one or more servers 730. Further, the client applications 766 may be capable of recognizing the elements in the images from the segmented data received from the one or more servers 730.

FIG. 17 shows a simplified example of the server 730-1. The server 730-1 typically includes one or more CPUs or processors 770, a network interface 778, memory 780, and bulk storage 782. In some implementations, the server 730-1 may be a general-purpose server and include one or more input devices 772 (e.g., a keypad, touchpad, mouse, and so on) and a display subsystem 774 including a display 776.

The network interface 778 connects the server 730-1 to the distributed communications system 770. For example, the network interface 778 may include a wired interface (e.g., an Ethernet interface) and/or a wireless interface (e.g., a Wi-Fi, Bluetooth, near field communication (NFC), or other wireless interface). The memory 780 may include volatile or nonvolatile memory, cache, or other type of memory. The bulk storage 782 may include flash memory, one or more magnetic hard disk drives (HDDs), and/or other bulk storage devices.

The processor 770 of the server 730-1 executes an operating system (OS) 784 and one or more server applications 786, which may be housed in a virtual machine hypervisor or containerized architecture. The bulk storage 782 may store one or more databases 788 that store data structures used by the server applications 786 to perform respective functions.

The server applications 786 include an application that accesses the client devices 720 via the distributed communications system 710. For example, one of the server applications 786 can receive a raw image or a preprocessed image of an object captured by one of the client devices 720. One of the server applications 786 may also be capable of preprocessing the raw images. One or more of the server applications 786 may be capable of segmenting the images as described above and recognizing the elements in the images from the segmented data. One or more of the server applications 786 may be capable of generating the segmentation model, initially training the segmentation model, devising the policy network for segmenting images, and learning during implementations and continually training the policy network during implementation as described above.

One or more of the server applications 786 may utilize the recognized data for purposes such as controlling one or more of the client devices 720 (e.g., security of a client device or movement of an autonomous vehicle). One or more of the server applications 786 may send the recognized data to one or more of the client devices 720. One or more server applications 786 and/or client applications 766 may utilize the recognized data for any other suitable purposes such as fleet management, product assembly and/or manufacturing, etc.

In some implementations, the segmentation methods of the present disclosure can be implemented in a cloud-based computing environment. For example, the segmentation methods can be hosted on one or more of the servers 730 located in a cloud. The segmentation methods can be provided on subscription basis or pay-per-use basis. For example, the segmentation methods can be provided as software-as-a-service (SaaS).

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip (SOC).

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for partitioning a two-dimensional (2D) array and recognizing elements of the 2D array, the system comprising:
a processor and memory storing instructions for the processor, the processor configured to execute the instructions to:
select a location in an array comprising pixel data of the 2D array;
select a direction in which to traverse the array from the selected location to segment the elements of the 2D array, the selected direction being based on data surrounding the selected location and based on a model generated by segmenting a plurality of 2D arrays;
define a penalty function and a reward function based on needs of an application partitioning the 2D array;
increment the reward function associated with the model in response to not encountering data representing one or more elements of the 2D array while traversing the array in the selected direction;
increment the penalty function associated with the model in response to encountering data representing one or more elements of the 2D array while traversing the array in the selected direction;
determine whether the data encountered while traversing the array in the selected direction represents one of the elements of the 2D array or represents a joint between two elements of the 2D array;
traverse the array in a different direction in response to determining that the data encountered represents one of the elements of the 2D array;
traverse through the joint between the two elements and continue traversing the array in the selected direction in response to determining that the data encountered represents a joint between two elements of the 2D array; and
recognize one or more of the elements of the 2D array segmented by traversing the array.

2. The system of claim 1 wherein the processor is further configured to execute the instructions to update the model based on one or more of the incremented reward and penalty functions and based on the pixel data of the 2D array.

3. The system of claim 1 wherein the processor is further configured to execute the instructions to select the location based on an a priori information about the pixel data of the 2D array.

4. The system of claim 1 wherein the elements of the 2D array include alphanumeric characters.

5. The system of claim 1 wherein the processor is further configured to execute the instructions to:
select one or more additional locations in the array based on the pixel data;
traverse the array from the selected location and the one or more additional locations in parallel in the selected direction to segment the elements of the 2D array; and
recognize a plurality of the elements of the 2D array segmented by traversing the array from the one or more additional locations.

6. The system of claim 5 wherein the processor is further configured to execute the instructions to select a total number of locations including the selected location and the one or more additional locations based on the pixel data.

7. The system of claim 5 wherein the processor is further configured to execute the instructions to select spacing between the selected location and the one or more additional locations based on the pixel data.

8. The system of claim 5 wherein the processor is further configured to execute the instructions to select widths of paths for traversing the array from the selected location and the one or more additional locations based on the pixel data.

9. The system of claim 8 wherein the processor is further configured to execute the instructions to select the widths to be equal.

10. The system of claim 8 wherein the processor is further configured to execute the instructions to select at least one of the widths to be different than others of the widths.

11. The system of claim 1 wherein the processor is further configured to execute the instructions to, prior to selecting the location:
receive the pixel data of the 2D array;
detect locations of the elements in the 2D array; and
correct one or more of orientation, intensity, and scaling of the 2D array.

12. The system of claim 1 wherein the processor is further configured to execute the instructions to recognize the one or more of the elements of the 2D array using respective classifiers.

13. A method for partitioning a two-dimensional (2D) array and recognizing elements of the 2D array, the method comprising:
selecting a location in an array comprising pixel data of the 2D array;
selecting a direction in which to traverse the array from the selected location to segment the elements of the 2D array, the selected direction being based on data surrounding the selected location and based on a model generated by segmenting a plurality of 2D arrays;
incrementing a reward function associated with the model in response to not encountering data representing one or more elements of the 2D array while traversing the array in the selected direction;

incrementing a penalty function associated with the model in response to encountering data representing one or more elements of the 2D array while traversing the array in the selected direction;

determining whether the data encountered while traversing the array in the selected direction represents one of the elements of the 2D array or represents a joint between two elements of the 2D array;

traversing the array in a different direction in response to determining that the data encountered represents one of the elements of the 2D array;

traversing through the joint between the two elements and continue traversing the array in the selected direction in response to determining that the data encountered represents a joint between two elements of the 2D array; and recognizing one or more of the elements of the 2D array segmented by traversing the array using respective classifiers.

14. The method of claim 13 further comprising updating the model based on one or more of the incremented reward and penalty functions and based on the pixel data of the 2D array.

15. The method of claim 13 further comprising selecting the location based on an a priori information about the pixel data of the 2D array.

16. The method of claim 13 further comprising:
selecting one or more additional locations in the array based on the pixel data;
traversing the array from the selected location and the one or more additional locations in parallel in the selected direction to segment the elements of the 2D array; and
recognizing a plurality of the elements of the 2D array segmented by traversing the array from the one or more additional locations.

17. The method of claim 16 further comprising selecting a total number of locations including the selected location and the one or more additional locations based on the pixel data.

18. The method of claim 16 further comprising selecting spacing between the selected location and the one or more additional locations based on the pixel data.

19. The method of claim 16 further comprising selecting widths of paths for traversing the array from the selected location and the one or more additional locations based on the pixel data.

20. The method of claim 13 further comprising, prior to selecting the location:
receiving the pixel data of the 2D array;
detecting locations of the elements in the 2D array; and
correcting one or more of orientation, intensity, and scaling of the 2D array.

* * * * *